(12) United States Patent
Pelletier et al.

(10) Patent No.: US 8,830,918 B2
(45) Date of Patent: Sep. 9, 2014

(54) METHOD AND APPARATUS FOR PERFORMING UPLINK TRANSMIT DIVERSITY

(75) Inventors: Benoit Pelletier, Roxboro (CA); Paul Marinier, Brossard (CA); Christopher R. Cave, Montreal (CA); Fengjun Xi, Huntington Station, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 206 days.

(21) Appl. No.: 12/723,131

(22) Filed: Mar. 12, 2010

(65) Prior Publication Data

US 2010/0246516 A1    Sep. 30, 2010

Related U.S. Application Data

(60) Provisional application No. 61/160,592, filed on Mar. 16, 2009, provisional application No. 61/248,241, filed on Oct. 2, 2009, provisional application No. 61/303,443, filed on Feb. 11, 2010.

(51) Int. Cl.
*H04W 4/00* (2009.01)

(52) U.S. Cl.
USPC .......................................................... 370/329

(58) Field of Classification Search
USPC ......... 370/203, 204–215, 229–240, 241–253, 370/310–337, 338–350, 395.1, 395.3, 370/395.4, 395.41, 395.42, 395.5, 395.52, 370/395.53, 412–421, 431–529, 523–520
See application file for complete search history.

(56) References Cited

U.S. PATENT DOCUMENTS

| | | | | |
|---|---|---|---|---|
| 7,881,742 | B2 * | 2/2011 | Gholmieh et al. | 455/522 |
| 7,916,681 | B2 * | 3/2011 | Andersson et al. | 370/318 |
| 8,060,130 | B2 * | 11/2011 | Gholmieh et al. | 455/522 |
| 2004/0248581 | A1 * | 12/2004 | Seki et al. | 455/450 |
| 2005/0101352 | A1 * | 5/2005 | Logothetis et al. | 455/562.1 |
| 2005/0152314 | A1 * | 7/2005 | Sun et al. | 370/334 |
| 2006/0262754 | A1 * | 11/2006 | Andersson et al. | 370/332 |
| 2007/0259682 | A1 * | 11/2007 | Kaikkonen et al. | 455/522 |
| 2008/0043867 | A1 | 2/2008 | Blanz et al. | |
| 2008/0153446 | A1 * | 6/2008 | Isaac et al. | 455/269 |
| 2008/0200202 | A1 * | 8/2008 | Montojo et al. | 455/522 |
| 2008/0207247 | A1 * | 8/2008 | Gholmieh et al. | 455/522 |
| 2009/0034502 | A1 * | 2/2009 | Kostic et al. | 370/342 |

(Continued)

FOREIGN PATENT DOCUMENTS

| | | |
|---|---|---|
| CN | 101095295 A | 12/2007 |
| JP | 2008-530896 | 8/2008 |

(Continued)

OTHER PUBLICATIONS

Motorola, "Uplink Su-MIMO Design Options for LTE Advanced," 3GPP TSG RAN1#56, R1-090805 (Feb. 9-13, 2009).

(Continued)

*Primary Examiner* — Jung-Jen Liu
(74) *Attorney, Agent, or Firm* — Frank Linguiti

(57) ABSTRACT

A method and apparatus for performing uplink (UL) transmit diversity implemented in a wireless transmit/receive unit (WTRU) includes receiving a signal including precoding information. The precoding information is detected and applied to an UL transmission. The UL transmission is transmitted with the applied precoding information.

23 Claims, 9 Drawing Sheets

(56) References Cited

U.S. PATENT DOCUMENTS

| | | | | |
|---|---|---|---|---|
| 2009/0036081 | A1* | 2/2009 | Catreux et al. | 455/277.1 |
| 2009/0086671 | A1* | 4/2009 | Pelletier et al. | 370/329 |
| 2009/0109912 | A1* | 4/2009 | DiGirolamo et al. | 370/329 |
| 2009/0143074 | A1* | 6/2009 | Pelletier et al. | 455/452.2 |
| 2009/0186624 | A1* | 7/2009 | Cave et al. | 455/450 |
| 2009/0196230 | A1* | 8/2009 | Kim et al. | 370/328 |
| 2009/0247161 | A1* | 10/2009 | Pani et al. | 455/435.3 |
| 2009/0307558 | A1* | 12/2009 | Lee et al. | 714/749 |
| 2010/0157956 | A1* | 6/2010 | Takahashi | 370/336 |
| 2010/0177745 | A1* | 7/2010 | Baker et al. | 370/336 |
| 2010/0238824 | A1 | 9/2010 | Farajidana et al. | |
| 2010/0246516 | A1* | 9/2010 | Pelletier et al. | 370/329 |
| 2010/0322356 | A1* | 12/2010 | Catreux-Erceg et al. | 375/340 |
| 2011/0098077 | A1* | 4/2011 | Gholmieh et al. | 455/522 |
| 2011/0111790 | A1* | 5/2011 | Andersson et al. | 455/522 |
| 2011/0149857 | A1* | 6/2011 | Lee et al. | 370/328 |
| 2011/0206154 | A1 | 8/2011 | Ding et al. | |
| 2011/0243203 | A1 | 10/2011 | Yamamoto et al. | |
| 2011/0261833 | A1 | 10/2011 | Yang | |
| 2011/0263281 | A1 | 10/2011 | Cai et al. | |
| 2012/0002658 | A1 | 1/2012 | Fan et al. | |
| 2012/0008510 | A1* | 1/2012 | Cai et al. | 370/252 |
| 2012/0082192 | A1 | 4/2012 | Pelletier et al. | |
| 2012/0113834 | A1 | 5/2012 | Hunzinger | |
| 2012/0287868 | A1 | 11/2012 | Sambhwani et al. | |
| 2013/0182794 | A1 | 7/2013 | Ringstrom et al. | |

FOREIGN PATENT DOCUMENTS

| | | |
|---|---|---|
| JP | 2008-546235 | 12/2008 |
| WO | 00/72464 | 11/2000 |
| WO | WO-00/72465 A1 | 11/2000 |
| WO | 2006/047909 | 5/2006 |
| WO | WO 2006/088301 | 8/2006 |
| WO | WO 2006/122805 | 11/2006 |
| WO | 2007/137280 | 11/2007 |
| WO | 2008021396 A2 | 2/2008 |
| WO | WO 2010/107699 A2 | 9/2010 |

OTHER PUBLICATIONS

Motorola, "Uplink Transmission Schemes for Multi-Antenna UE," TSG-RAN WG1 #54bis, R1-083829 (Sep. 29-Oct. 3, 2008).
Third Generation Partnership Project, "Technical Specification Group Radio Access Network; Physical Channels and Mapping of Transport Channels onto Physical Channels (FDD) (Release 1999)," 3GPP TS 25.211 V3.12.0 (Sep. 2002).
Third Generation Partnership Project, "Technical Specification Group Radio Access Network; Physical Channels and Mapping of Transport Channels onto Physical Channels (FDD) (Release 4)," 3GPP TS 25.211 V3.6.0 (Sep. 2002).
Third Generation Partnership Project, "Technical Specification Group Radio Access Network; Physical Channels and Mapping of Transport Channels onto Physical Channels (FDD) (Release 5)," 3GPP TS 25.211 V5.8.0 (Dec. 2005).
Third Generation Partnership Project, "Technical Specification Group Radio Access Network; Physical Channels and Mapping of Transport Channels onto Physical Channels (FDD) (Release 6)," 3GPP TS 25.211 V6.9.0 (Nov. 2007).
Third Generation Partnership Project, "Technical Specification Group Radio Access Network; Physical Channels and Mapping of Transport Channels onto Physical Channels (FDD) (Release 6)," 3GPP TS 25.211 V6.10.0 (Sep. 2009).
Third Generation Partnership Project, "Technical Specification Group Radio Access Network; Physical Channels and Mapping of Transport Channels onto Physical Channels (FDD) (Release 7)," 3GPP TS 25.211 V7.6.0 (May 2008).
Third Generation Partnership Project, "Technical Specification Group Radio Access Network; Physical Channels and Mapping of Transport Channels onto Physical Channels (FDD) (Release 7)," 3GPP TS 25.211 V7.9.0 (Dec. 2009).
Third Generation Partnership Project, "Technical Specification Group Radio Access Network; Physical Channels and Mapping of Transport Channels onto Physical Channels (FDD) (Release 8)," 3GPP TS 25.211 V8.3.0 (Dec. 2008).
Third Generation Partnership Project, "Technical Specification Group Radio Access Network; Physical Channels and Mapping of Transport Channels onto Physical Channels (FDD) (Release 8)," 3GPP TS 25.211 V8.6.0 (Dec. 2009).
Third Generation Partnership Project, "Technical Specification Group Radio Access Network; Physical Channels and Mapping of Transport Channels onto Physical Channels (FDD) (Release 9)," 3GPP TS 25.211 V9.1.0 (Dec. 2009).
Third Generation Partnership Project, "Technical Specification Group Radio Access Network; Multiplexing and Channel Coding (FDD) (Release 1999)," 3GPP TS 25.212 V3.11.0 (Sep. 2002).
Third Generation Partnership Project, "Technical Specification Group Radio Access Network; Multiplexing and Channel Coding (FDD) (Release 4)," 3GPP TS 25.212 V4.6.0 (Sep. 2002).
Third Generation Partnership Project, "Technical Specification Group Radio Access Network; Multiplexing and Channel Coding (FDD) (Release 5)," 3GPP TS 25.212 V5.10.0 (Jun. 2005).
Third Generation Partnership Project, "Technical Specification Group Radio Access Network; Multiplexing and Channel Coding (FDD) (Release 6)," 3GPP TS 25.212 V6.10.0 (Dec. 2006).
Third Generation Partnership Project, "Technical Specification Group Radio Access Network; Multiplexing and Channel Coding (FDD) (Release 7)," 3GPP TS 25.212 V7.9.0 (Sep. 2008).
Third Generation Partnership Project, "Technical Specification Group Radio Access Network; Multiplexing and Channel Coding (FDD) (Release 7)," 3GPP TS 25.212 V7.11.0 (Sep. 2009).
Third Generation Partnership Project, "Technical Specification Group Radio Access Network; Multiplexing and Channel Coding (FDD) (Release 8)," 3GPP TS 25.212 V8.4.0 (Dec. 2008).
Third Generation Partnership Project, "Technical Specification Group Radio Access Network; Multiplexing and Channel Coding (FDD) (Release 8)," 3GPP TS 25.212 V8.6.0 (Sep. 2009).
Third Generation Partnership Project, "Technical Specification Group Radio Access Network; Multiplexing and Channel Coding (FDD) (Release 9)," 3GPP TS 25.212 V9.1.0 (Dec. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.0.1 (Dec. 2009).
Third Generation Partnership Project, "Technical Specification Group Radio Access Network; Evolved Universal Terrestrial Radio Access (E-UTRA); Physical layer procedures (Release 8)," 3GPP TS 36.213 V8.5.0 (Dec. 2008).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Physical layer procedures (FDD) (Release 8)," 3GPP TS 25.214 V8.4.0 (Dec. 2008).
Third Generation Partnership Project, "Technical Specification Group Radio Access Network; Physical layer procedures (FDD) (Release 8)," 3GPP TS 25.214 V8.8.0 (Dec. 2009).
Third Generation Partnership Project, "Technical Specification Group Radio Access Network; Physical layer procedures (FDD) (Release 9)," 3GPP TS 25.214 V9.1.0 (Dec. 2009).
Third Generation Partnership Project, "Technical Specification Group Radio Access Network; Physical Channels and Mapping of Transport Channels onto Physical Channels (FDD) (Release 1999)" 3GPP TS 25.211 V3.12.0 (Sep. 2002).
Third Generation Partnership Project, "Technical Specification Group Radio Access Network; Physical Channels and Mapping of Transport Channels onto Physical Channels (FDD) (Release 4)" 3GPP TS 25.211 V4.6.0 (Sep. 2002).
Third Generation Partnership Project, "Technical Specification Group Radio Access Network; Physical Channels and Mapping of Transport Channels onto Physical Channels (FDD) (Release 5)" 3GPP TS 25.211 V5.8.0 (Dec. 2005).

(56) References Cited

OTHER PUBLICATIONS

Third Generation Partnership Project, "Technical Specification Group Radio Access Network; Physical Channels and Mapping of Transport Channels onto Physical Channels (FDD) (Release 6)" 3GPP TS 25.211 V6.9.0 (Nov. 2007).

Third Generation Partnership Project, "Technical Specification Group Radio Access Network; Physical Channels and Mapping of Transport Channels onto Physical Channels (FDD) (Release 6)" 3GPP TS 25.211 V6.10.0 (Sep. 2009).

Third Generation Partnership Project, "Technical Specification Group Radio Access Network; Physical Channels and Mapping of Transport Channels onto Physical Channels (FDD) (Release 7)" 3GPP TS 25.211 V7.6.0 (May 2008).

Third Generation Partnership Project, "Technical Specification Group Radio Access Network; Physical Channels and Mapping of Transport Channels onto Physical Channels (FDD) (Release 7)" 3GPP TS 25.211 V7.9.0 (Dec. 2009).

Third Generation Partnership Project, "Technical Specification Group Radio Access Network; Physical Channels and Mapping of Transport Channels onto Physical Channels (FDD) (Release 8)" 3GPP TS 25.211 V8.3.0 (Dec. 2008).

Third Generation Partnership Project, "Technical Specification Group Radio Access Network; Physical Channels and Mapping of Transport Channels onto Physical Channels (FDD) (Release 8)" 3GPP TS 25.211 V8.6.0 (Dec. 2009).

Third Generation Partnership Project, "Technical Specification Group Radio Access Network; Physical Channels and Mapping of Transport Channels onto Physical Channels (FDD) (Release 9)" 3GPP TS 25.211 V9.1.0 (Dec. 2009).

Third Generation Partnership Project, "Technical Specification Group Radio Access Network; Multiplexing and Channel Coding (FDD) (Release 1999)" 3GPP TS 25.212 V3.11.0 (Sep. 2002).

Third Generation Partnership Project, "Technical Specification Group Radio Access Network; Multiplexing and Channel Coding (FDD) (Release 4)" 3GPP TS 25.212 V4.6.0 (Sep. 2002).

Third Generation Partnership Project, "Technical Specification Group Radio Access Network; Multiplexing and Channel Coding (FDD) (Release 5)" 3GPP TS 25.212 V5.10.0 (Jun. 2005).

Third Generation Partnership Project, "Technical Specification Group Radio Access Network; Multiplexing and Channel Coding (FDD) (Release 6)" 3GPP TS 25.212 V6.10.0 (Dec. 2006).

Third Generation Partnership Project, "Technical Specification Group Radio Access Network; Multiplexing and Channel Coding (FDD) (Release 7)" 3GPP TS 25.212 V7.9.0 (Sep. 2008).

Third Generation Partnership Project, "Technical Specification Group Radio Access Network; Multiplexing and Channel Coding (FDD) (Release 7)" 3GPP TS 25.212 V7.11.0 (Sep. 2009).

Third Generation Partnership Project, "Technical Specification Group Radio Access Network; Multiplexing and Channel Coding (FDD) (Release 8)" 3GPP TS 25.212 V8.4.0 (Dec. 2008).

Third Generation Partnership Project, "Technical Specification Group Radio Access Network; Multiplexing and Channel Coding (FDD) (Release 8)" 3GPP TS 25.212 V8.6.0 (Sep. 2009).

Third Generation Partnership Project, "Technical Specification Group Radio Access Network; Multiplexing and Channel Coding (FDD) (Release 9)" 3GPP TS 25.212 V9.1.0 (Dec. 2009).

"3rd Generation Partnership Project; Technical Specification Group Radio Access Network; Enhanced uplink; Overall description; Stage 2 (Release 10)", 3GPP TS 25.319 V10.3.0, Dec. 2010, 79 pages.

"3rd Generation Partnership Project; Technical Specification Group Radio Access Network; Radio Resource Control (RRC); Protocol specification (Release 10)", 3GPP TS 25.331 V10.3.0, Mar. 2011, 1,863 pages.

"Chinese First Office Action", Chinese Patent Application 201080012051.6, Jul. 2013, 7 pages.

"Chinese First Office Action (English Translation)", Chinese Patent Application No. 20108001251.6, Jul. 2013, 10 pages.

"International Search Report and Written Opinion", International Application No. PCT/US2010/024632, May 25, 2012, 14 pages.

"Japanese Final Rejection (English Translation)", Japanese Application No. 2012-50082,Oct. 1, 2013, 2 Pages.

"Japanese Notice of Rejection", Japanese Application No. 2012-500852, Oct. 1, 2013, 2 Pages.

"Korean Office Action", Korean Application No. 10-2011-7024348, Jul. 24, 2013, 3 Pages.

"Korean Office Action (English Translation)", Korean Application No. 10-2011-7024348, Jul. 24, 2013, 3 Pages.

Ericsson, et al., "Initial considerations on the design for UL MIMO for HSUPA", 3GPP TSG RAN WG1 Meeting #63bis, R1-110496, Dublin, Ireland, Jan. 11, 2011, 16 pages.

Ericsson, et al., "On the design of uplink closed loop transmit diversity for HSUPA", 3GPP TSG RAN WG1 Meeting #63bis, R1-110489, Dublin, Ireland, Jan. 11, 2011, 6 pages.

Ericsson, et al., "Pre-Coding Selection for CLTD", 3GPP TSG RAN WG1 Meeting#63bis, R1-110488, Dublin, Ireland, Jan. 11, 2011, 3 pages.

Huawei, et al., "Initial considerations on Uplink Closed Loop Transmit Diversity", 3GPP TSG RAN WG1 Meeting#63bis, R1-110309, Dublin, Ireland, Jan. 13, 2011, 5 pages.

Huawei, "New WI proposal: Uplink Transmit Diversity for HSPA", 3GPP TSG-RAN #50, RP-101428, Istanbul, Turkey, Dec. 7-10, 2010, 6 pages.

\* cited by examiner

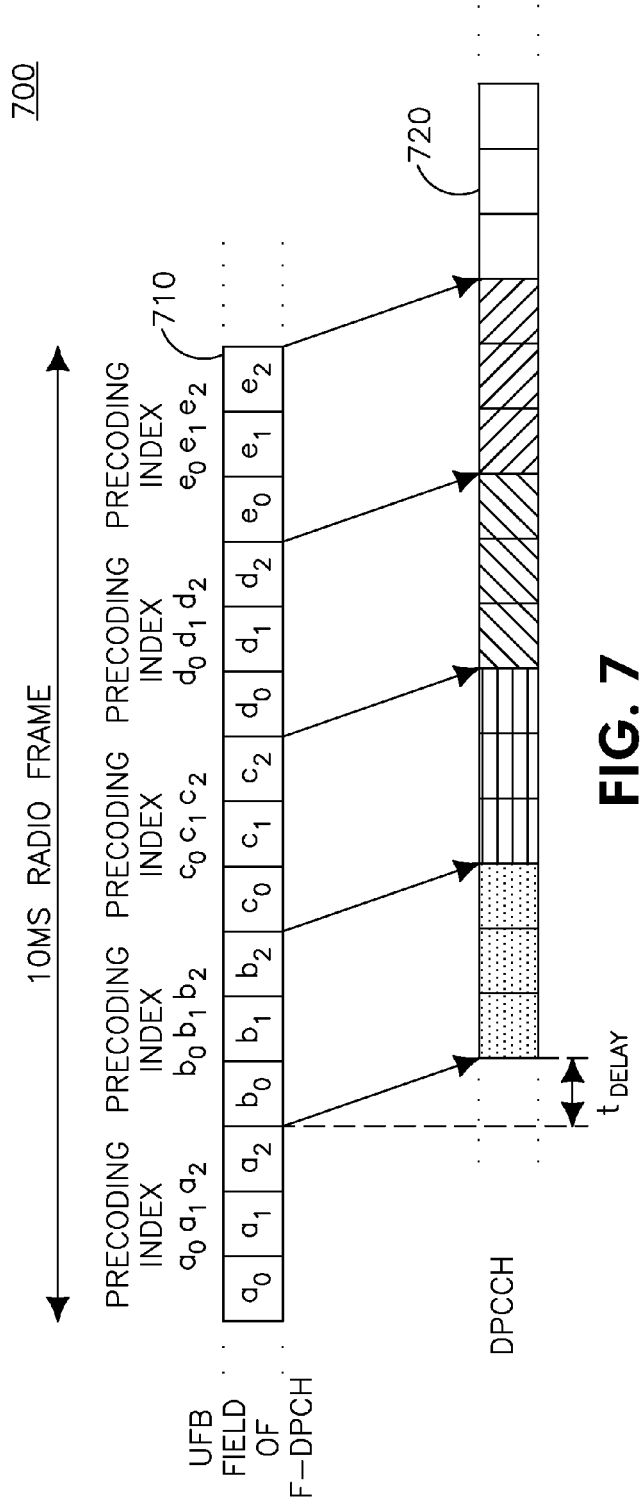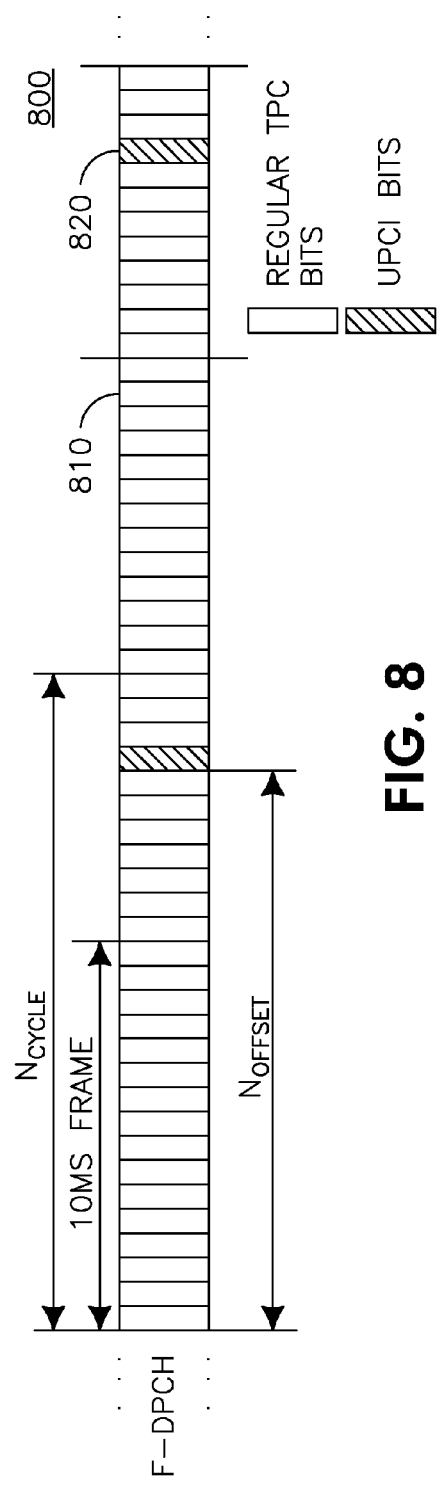
FIG. 7
FIG. 8

METHOD AND APPARATUS FOR PERFORMING UPLINK TRANSMIT DIVERSITY

CROSS REFERENCE TO RELATED APPLICATIONS

This application claims the benefit of U.S. Provisional Application Nos. 61/160,592, filed Mar. 16, 2009, 61/248,241, filed Oct. 2, 2009, and 61/303,443, filed Feb. 11, 2010, which are incorporated by reference herein as if fully set forth.

FIELD OF INVENTION

This application is related to wireless communications.

BACKGROUND

Wireless transmit/receive units (WTRUs) may be equipped with receive antenna diversity. For example, certain receiver types in the Third Generation Partnership Project (3GPP) requirements may be designed with the assumption of receive diversity. Furthermore, in technical specifications, such as in Release 7 (R7) of the 3GPP Wideband Code Division Multiple Access (WCDMA) Frequency Division Duplex (FDD) specifications, support for downlink multiple-input multiple output (MIMO) operations has been defined. In R7 MIMO, for example, spatial multiplexing is achieved by means of two antennas at the transmitter, (e.g., Node-B) and two antennas at the receiver, (e.g. WTRU). Due to the potential high data rate achievable with MIMO receivers and the performance increase resulting from receive diversity alone, it is possible that the number of WTRUs built with two receive antennas increases over the years.

However, while WTRUs may be built with multiple antennas for receive diversity and MIMO operations, there is currently no method for the WTRU to transmit using spatial diversity. Doing so may potentially provide increased uplink (UL) coverage, as well as system-level gains due to lower interference. Therefore, it would be beneficial to provide a method and apparatus for performing uplink transmit diversity.

SUMMARY

A method and apparatus for performing uplink (UL) transmit diversity implemented in a wireless transmit/receive unit (WTRU) is disclosed. The method includes receiving a signal including uplink precoding information. The uplink precoding information is detected and applied to an UL transmission. The UL transmission is transmitted with the applied precoding weights.

BRIEF DESCRIPTION OF THE DRAWINGS

A more detailed understanding may be had from the following description, given by way of example in conjunction with the accompanying drawings wherein:

FIG. 7 shows an example F-DPCH frame depicting an example of UL feedback bits combining;

FIG. 8 shows an example F-DPCH having an uplink precoding information (UPCI) pattern cycle;

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

Figure 1:
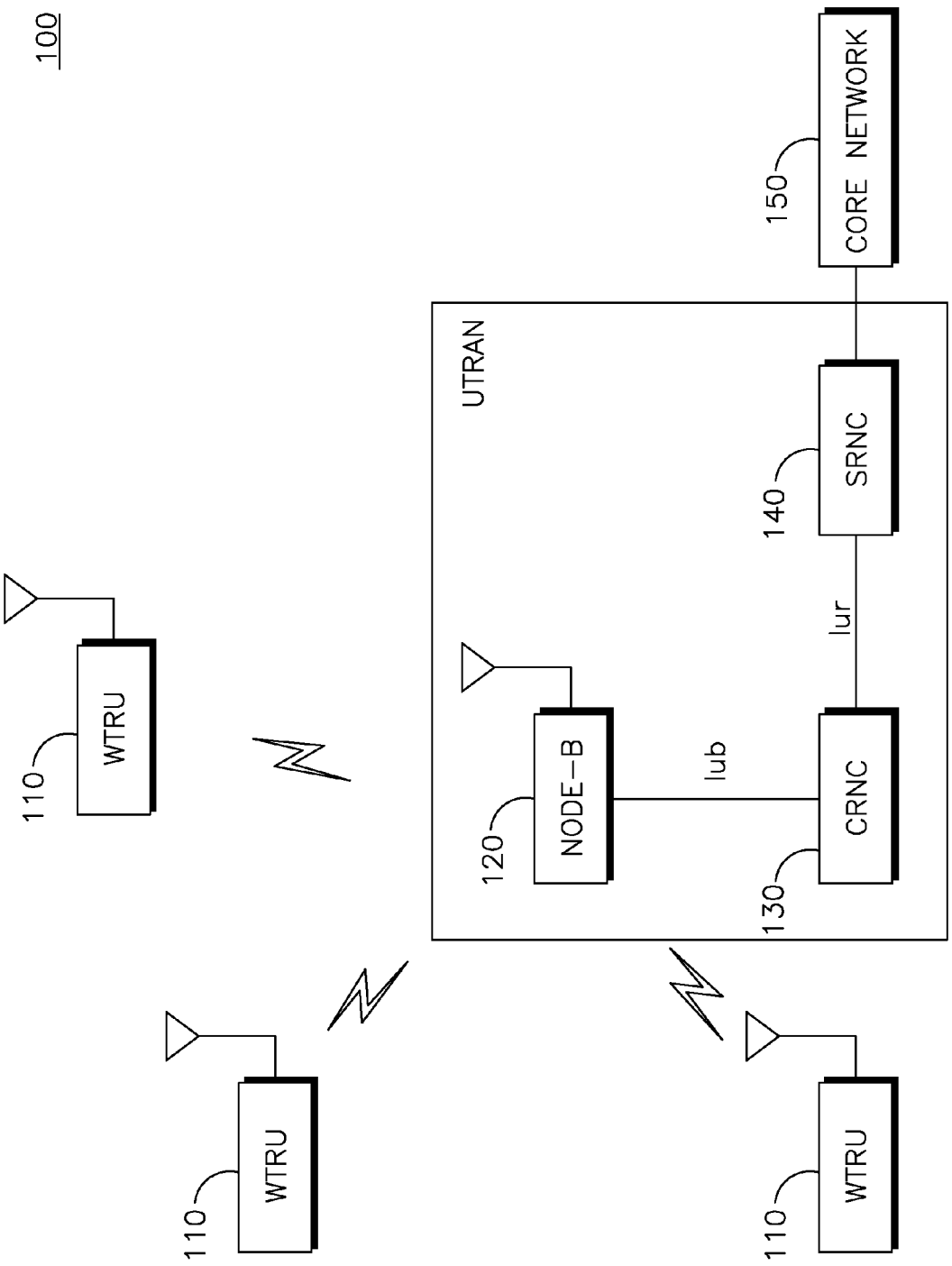
FIG. 1 shows an example wireless communication system including a plurality of WTRUs, a Node-B, a controlling radio network controller (CRNC), a serving radio network controller (SRNC), and a core network.

FIG. 1 shows a wireless communication system 100 including a plurality of WTRUs 110, a Node-B 120, a controlling radio network controller (CRNC) 130, a serving radio network controller (SRNC) 140, and a core network 150. The Node-B 120 and the CRNC 130 may collectively be referred to as the UTRAN.

As shown in FIG. 1, the WTRUs 110 are in communication with the Node-B 120, which is in communication with the CRNC 130 and the SRNC 140. Although three WTRUs 110, one Node-B 120, one CRNC 130, and one SRNC 140 are shown in FIG. 1, it should be noted that any combination of wireless and wired devices may be included in the wireless communication system 100.

Figure 2:
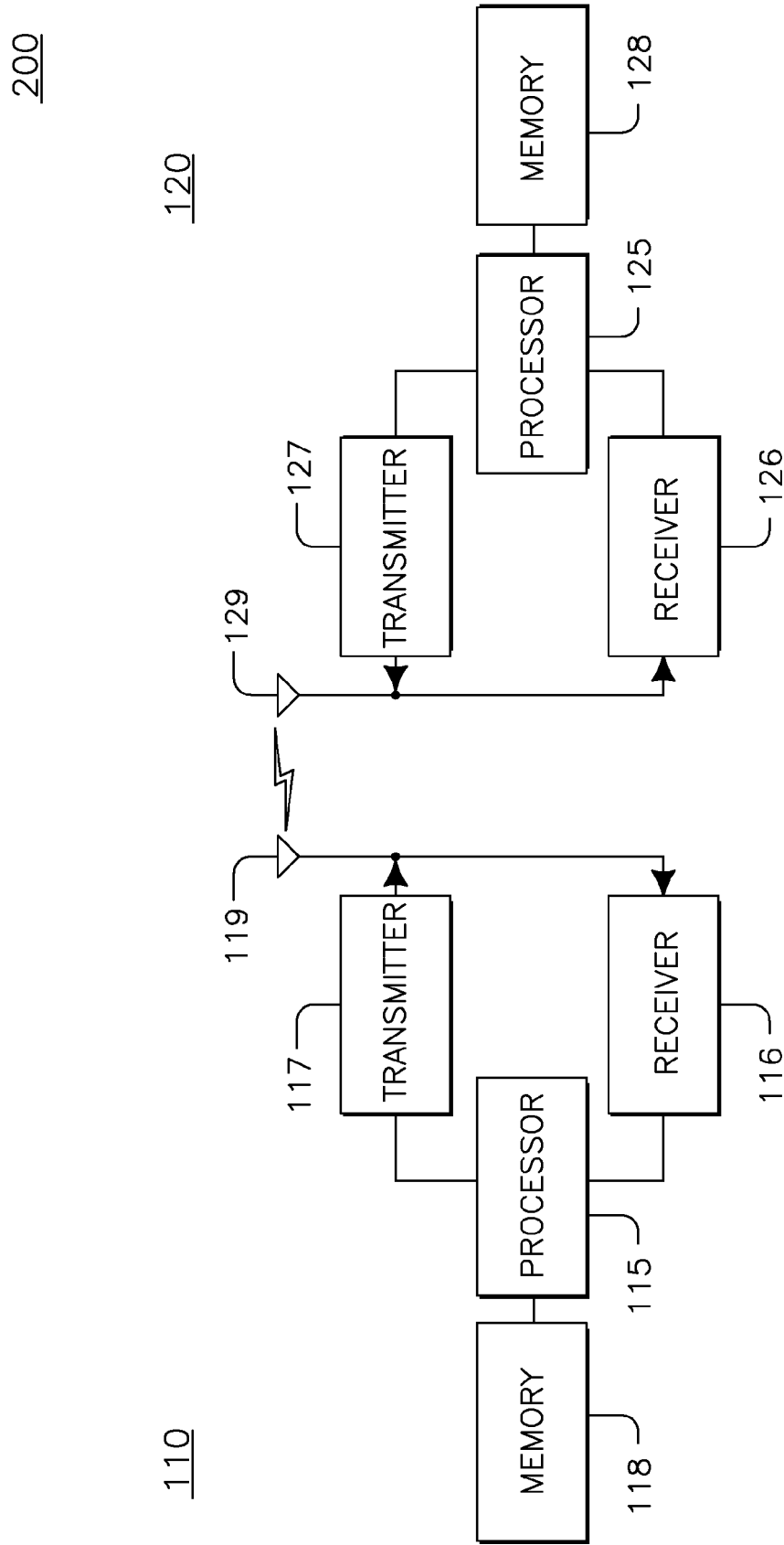
FIG. 2 is an example functional block diagram of a WTRU and the Node-B of the wireless communication system of FIG. 1.

FIG. 2 is a functional block diagram 200 of a WTRU 110 and the Node-B 120 of the wireless communication system 100 of FIG. 1. As shown in FIG. 2, the WTRU 110 is in communication with the Node-B 120 and both are configured to perform a method of uplink transmit diversity.

In addition to the components that may be found in a typical WTRU, the WTRU 110 includes a processor 115, a receiver 116, a transmitter 117, a memory 118 and an antenna 119. The memory 118 is provided to store software including operating system, application, etc. The processor 115 is provided to perform, alone or in association with the software, a method of uplink transmit diversity. The receiver 116 and the transmitter 117 are in communication with the processor 115. The antenna 119 is in communication with both the receiver 116 and the transmitter 117 to facilitate the transmission and reception of wireless data. It may also be noted that, although only one antenna 119 is shown in the WTRU 110, multiple antennas may be utilized by the WTRU 110 in order to facilitate uplink transmit diversity.

In addition to the components that may be found in a typical Node-B, the Node-B 120 includes a processor 125, a receiver 126, a transmitter 127, a memory 128 and an antenna 129. The processor 125 is configured to perform a method uplink transmit diversity. The receiver 126 and the transmitter 127 are in communication with the processor 125. The antenna 129 is in communication with both the receiver 126 and the transmitter 127 to facilitate the transmission and reception of wireless data. It may also be noted that, although only one antenna 129 is shown in Node-B 120, multiple antennas may be utilized in the Node-B 120 in order to facilitate transmit diversity.

Figure 3:
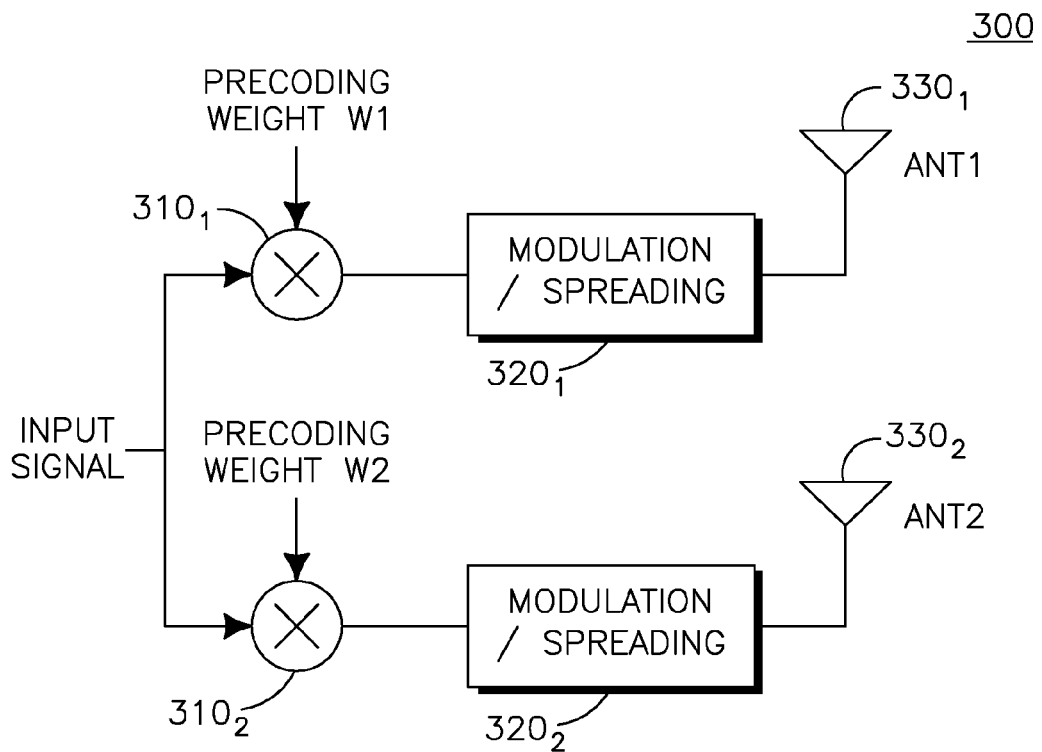
FIG. 3 is an example functional block diagram of a WTRU having transmit diversity.

A number of methods are described herein for implementing uplink transmit diversity, such as spatial transmit diversity. A WTRU 110 implementing UL transmit diversity may include more than one antenna as described above. Accordingly, FIG. 3 is an example functional block diagram of a WTRU 300 having transmit diversity, such as spatial transmit diversity. The WTRU 300 includes insertion devices $310_1$ and $310_2$, modulation/spreading devices $320_1$ and $320_2$, and antennas $330_1$ and $330_2$. The insertion devices, $310_1$ and $310_2$, receive an input signal and insert precoding weights w1 and w2, respectively, into the signal. The precoding weight w1 may be, for example, a phase angle applied to the signal while precoding weight w2 may be a phase angle that is phase shifted from the phase of precoding weight w1. Modulation/spreading devices $320_1$ and $320_2$ receive signals from insertion devices $310_1$ and $310_2$ and modulate and spread the signal. The modulation/spreading devices $320_1$ and $320_2$ may spread their respective signals with different or the same spreading codes and modulation. The antennas $330_1$ and $330_2$ receive the respective signals from modulation/spreading devices $320_1$ and $320_2$ for transmission over the air.

Figure 4:
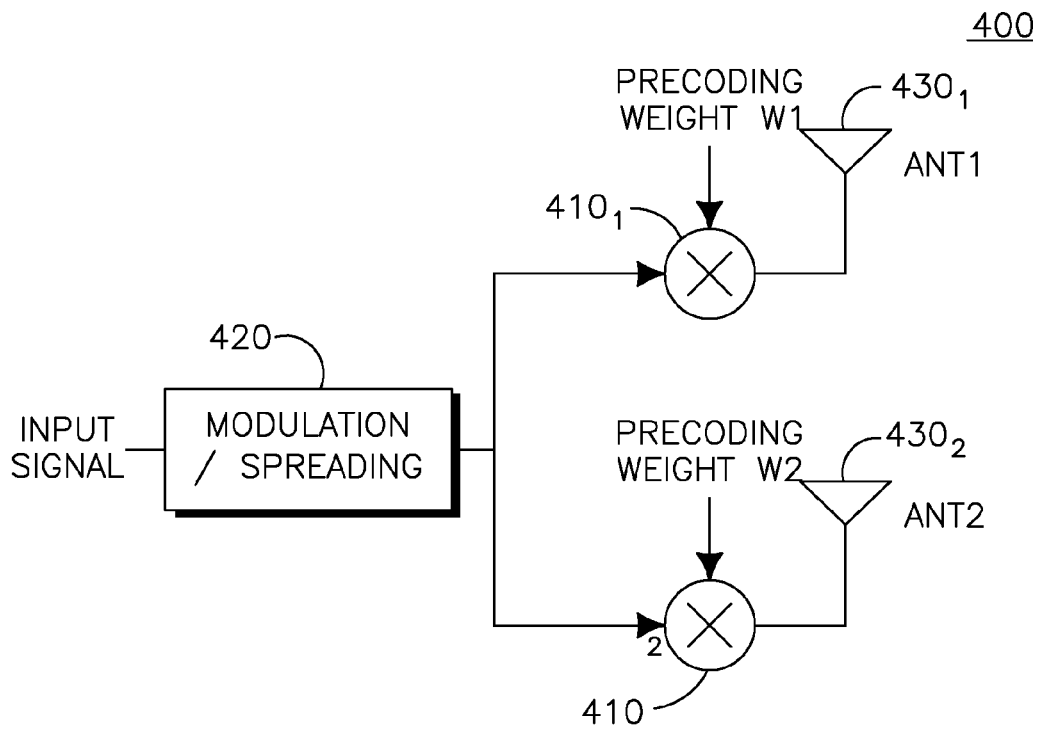
FIG. 4 is an example functional block diagram of an alternative WTRU having transmit diversity.

FIG. 4 is an example functional block diagram of an alternative WTRU 400 having transmit diversity, such as spatial transmit diversity. The WTRU 400 includes insertion devices $410_1$ and $410_2$, a modulation/spreading device 420, and antennas $430_1$ and $430_2$. The modulation/spreading device 420 receives an input signal and modulates/spreads the signal. The insertion devices, $410_1$ and $410_2$, receive the signal from the modulation/spreading device 420 and insert precoding weights w1 and w2, respectively, into the signal. The precoding weight w1 may be, for example, a phase angle applied to the signal while precoding weight w2 may be a phase angle that is phase shifted from the phase of precoding weight w1. The antennas $430_1$ and $430_2$ receive the respective signals from insertion devices $410_1$ and $410_2$ for transmission over the air. In this alternative, the precoding weights w1 and w2 are inserted into the signal after it has been spread/modulated by the modulation/spreading device 420.

In order to implement transmit diversity, there are two methods that may be employed, open loop transmit diversity and closed loop transmit diversity. In open loop transmit diversity, the transmitter is not aware of the channel information as it is detected in the receiver. Accordingly, less control feedback is transmitted on the downlink. When referred to hereafter, the WTRU may refer to WTRU 110, WTRU 300, WTRU 400, or any other type of WTRU.

In an open loop transmit diversity scheme, the WTRU may use space-time transmit diversity with space-time block coding. Additionally, an Alamouti scheme may be applied at the chip level as opposed to the symbol level since the UL modulation may be neither quadrature phase shift keying (QPSK) nor 16 quadrature amplitude modulation (QAM). This may also apply to a downlink signal, such as a wideband code division multiple access (WCDMA) frequency division duplex (FDD) DL signal. Joint space-time block coding with time delay transmit diversity may also be utilized.

In an alternative scheme for open loop transmit diversity, the transmit diversity may be achieved via a hybrid automatic repeat request (HARQ) procedure. For example, a set of configured or pre-defined precoding weights may be applied to each antenna for each HARQ retransmission. The Node B 120 may know which precoding weight is used based on, for example, the retransmission sequence number (RSN) value over the E-DPCCH, the system frame number (SFN), connection frame number (CFN), the subframe number, or any combination thereof.

Transmit diversity may also be achieved in an open loop scheme by time alternating a set of pre-defined or pre-configured precoding weights. A WTRU may then use a different set of precoding weights in a time alternated manner, where the unit of time for alternating the precoding weights may also be pre-configured or pre-determined as, for example, a given number of slots, TTIs, or frames. In one example, the WTRU may be configured with a set of four precoding weights. A different set of weights may be used every TTI so that the Node B will be aware of which precoding weights are being used.

In another alternative open loop transmit diversity scheme, time delayed transmit diversity may be employed. For example, the transmission over one antenna may be delayed with respect to the transmission over another antenna, where the time delay may be pre-configured or predefined, such as by the network. Alternatively, one set of precoding weights may be used for the non-delayed transmission while another set is used for the time delayed transmitted signal. Additionally, the precoding weights or delay may be varied from one HARQ transmission to another based on, for example, the RSN, SFN, CFN, subframe number, or any combination thereof.

In contrast to an open loop transmit diversity scheme, in a closed loop transmit diversity scheme, the transmitter has knowledge of the state of the channel that is detected at the receiver, or of the precoding information desired to be used. This knowledge may be in the form of the receiver, (for example the Node B 120), communicating to the transmitter, (for example the WTRU), the precoding weights that the Node B 120 desires be used. This may be achieved by transmitting the information back to the transmitter on a fast feedback channel. Alternatively or additionally, the transmitter, (e.g., WTRU), may utilize channel state information to determine which precoding weights to apply or use for transmission.

The preferred precoding weight information transmitted from the receiver back to the transmitter may include, for example, an index to a table of precoding weights. In one example, each indexed position in the table contains one or more precoding weights corresponding to one or more precoding vectors. In such an example, a precoding vector may include of one or more weights forming a weight vector $w_k = [w_{k,1}, w_{k,2}, \ldots w_{k,N}]$, where k is the weight vector index and N is the number of elements in the vector corresponding to the number of antennas. For the special case of two antennas, as depicted in the examples of FIGS. 3 and 4, the precoding vectors contain two entries (one per antenna) w1 and w2. In general, when considering multiple precoding vectors, each vector k may be expressed as $w_k = [w_{k,1}\ w_{k,2}]$. An example table containing N multiple weight vectors for a two-antennas transmit diversity system is shown in Table 1 below.

TABLE 1

| Precoding vector index | Weight vector |
|---|---|
| 1 | $w_1 = [w_{1,1}, w_{1,2}]$ |
| 2 | $w_2 = [w_{2,1}, w_{2,2}]$ |

TABLE 1-continued

| Precoding vector index | Weight vector |
|---|---|
| ... | ... |
| N | $w_N = [w_{N,1}, w_{N,2}]$ |

Figure 5:
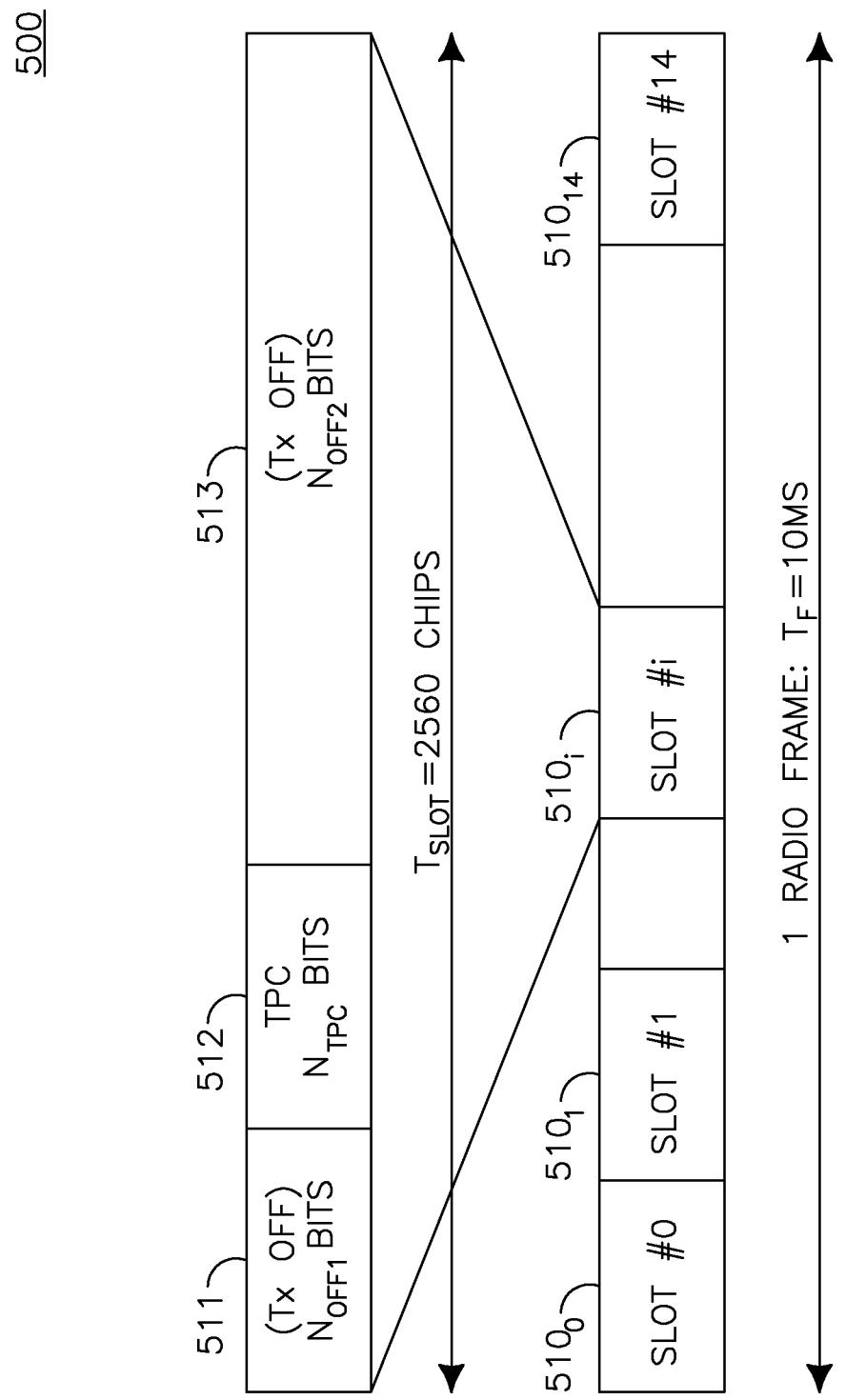
FIG. 5 shows an example Fractional Dedicated Physical Channel (F-DPCH) frame format.

In one method of performing closed loop diversity, feedback may be carried on, for example, the F-DPCH. The transmitter receiving the feedback, such as the WTRU, may reinterpret the values of the F-DPCH bits in order to determine which precoding weights, or weight vectors, to use. FIG. 5 shows an example F-DPCH frame format 500, which may be similar to a conventional F-DPCH frame format. The F-DPCH frame format 500 includes a plurality of slots 510, (e.g., $510_0, 510_1, \ldots, 510_i, \ldots, 510_{14}$). Each slot 510 includes a plurality of fields, such as a transmit offset field (Tx OFF), a transmit power control (TPC) field, and another Tx OFF field. Using slot $510_i$ for example, Tx OFF field 511 includes $N_{OFF1}$ bits, TPC field 512 includes $N_{TPC}$ bits, and Tx OFF field 512 includes $N_{OFF2}$ bits. Table 2 below is an example information table showing the information in the fields of the example F-DPCH slot $510_i$.

TABLE 2

| Slot Format #i | Channel Bit Rate (kbps) | Channel Symbol Rate (ksps) | SF | Bits/ Slot | $N_{OFF1}$ Bits/ Slot | $N_{TPC}$ Bits/ Slot | $N_{OFF2}$ Bits/ Slot |
|---|---|---|---|---|---|---|---|
| 0 | 3 | 1.5 | 256 | 20 | 2 | 2 | 16 |
| 1 | 3 | 1.5 | 256 | 20 | 4 | 2 | 14 |
| 2 | 3 | 1.5 | 256 | 20 | 6 | 2 | 12 |
| 3 | 3 | 1.5 | 256 | 20 | 8 | 2 | 10 |
| 4 | 3 | 1.5 | 256 | 20 | 10 | 2 | 8 |
| 5 | 3 | 1.5 | 256 | 20 | 12 | 2 | 6 |
| 6 | 3 | 1.5 | 256 | 20 | 14 | 2 | 4 |
| 7 | 3 | 1.5 | 256 | 20 | 16 | 2 | 2 |
| 8 | 3 | 1.5 | 256 | 20 | 18 | 2 | 0 |
| 9 | 3 | 1.5 | 256 | 20 | 0 | 2 | 18 |

Referring now to Table 2 above, the F-DPCH slot $510_i$ includes 2 bits of information for the TPC command per slot, (i.e., $N_{TPC}=2$). In one example F-DPCH slot format, one of the two TPC command bits may be utilized to indicate the TPC command while the other indicates which precoding weight to apply. For example, if the second bit in the TPC field 512 of F-DPCH slot format $510_i$ is a "0", then the first precoding weight vector (w1) may be applied, while if the second bit is a "1", then the second precoding weight vector (w2) may be applied. The WTRU may then apply the precoding weights in each slot at the same time the corresponding TPC command is applied.

Figure 6:
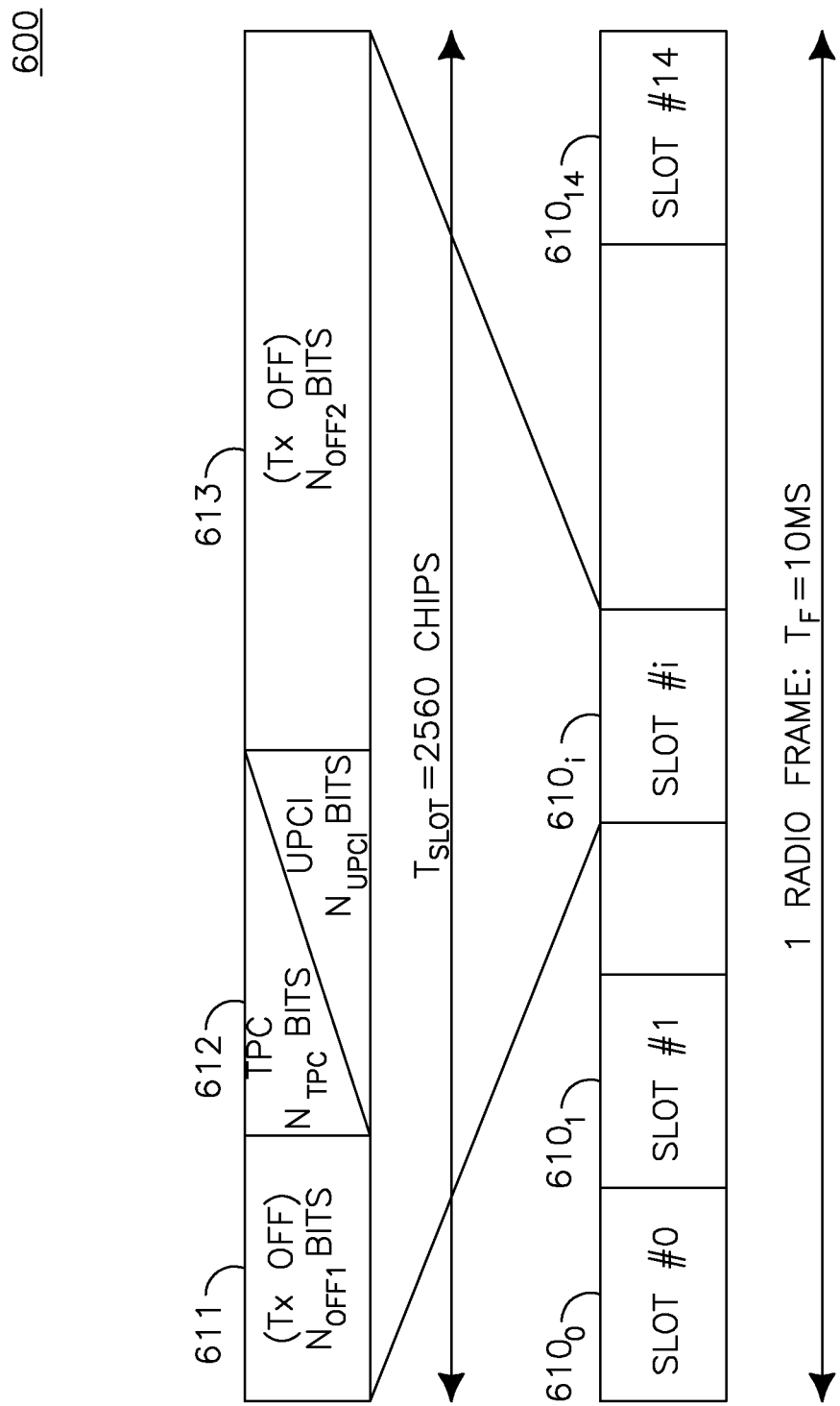
FIG. 6 shows an example alternative F-DPCH frame format.

In an alternative method, a modified F-DPCH slot format may be utilized to inform the WTRU of the precoding weights, or weight vector, that the Node B desires the WTRU to use. FIG. 6 shows such an example alternative F-DPCH frame format 600. The F-DPCH frame format 600 includes a plurality of slots 610, (e.g., $610_0, 610_1, \ldots, 610_i, \ldots, 610_{14}$), which similarly to F-DPCH format 500, include a plurality of fields. Using slot $610_i$ for example, Tx OFF field 611 includes $N_{OFF1}$ bits and Tx OFF field 612 includes $N_{OFF2}$ bits. However, field 612 is both a TPC and uplink precoding information (UPCI) field that includes both an $N_{TPC}$ bit and an $N_{UPCI}$ bit. Table 3 below is an example information table showing the information in the fields of the example F-DPCH slot format $610_i$.

TABLE 3

| Slot Format #i | Channel Bit Rate (kbps) | Channel Symbol Rate (ksps) | SF | Bits/ Slot | $N_{OFF1}$ Bits/ Slot | $N_{TPC}$ Bits/ Slot | $N_{UPCI}$ Bits/ Slot | $N_{OFF2}$ Bits/ Slot |
|---|---|---|---|---|---|---|---|---|
| 0 | 3 | 1.5 | 256 | 20 | 2 | 2 | 0 | 16 |
| 0A* | 3 | 1.5 | 256 | 20 | 2 | 1 | 1 | 16 |
| 1 | 3 | 1.5 | 256 | 20 | 4 | 2 | 0 | 14 |
| 1A* | 3 | 1.5 | 256 | 20 | 4 | 1 | 1 | 14 |
| 2 | 3 | 1.5 | 256 | 20 | 6 | 2 | 0 | 12 |
| 2A* | 3 | 1.5 | 256 | 20 | 6 | 1 | 1 | 12 |
| 3 | 3 | 1.5 | 256 | 20 | 8 | 2 | 0 | 10 |
| 3A* | 3 | 1.5 | 256 | 20 | 8 | 1 | 1 | 10 |
| 4 | 3 | 1.5 | 256 | 20 | 10 | 2 | 0 | 8 |
| 4A* | 3 | 1.5 | 256 | 20 | 10 | 1 | 1 | 8 |
| 5 | 3 | 1.5 | 256 | 20 | 12 | 2 | 0 | 6 |
| 5A* | 3 | 1.5 | 256 | 20 | 12 | 1 | 1 | 6 |
| 6 | 3 | 1.5 | 256 | 20 | 14 | 2 | 0 | 4 |
| 6A* | 3 | 1.5 | 256 | 20 | 14 | 1 | 1 | 4 |
| 7 | 3 | 1.5 | 256 | 20 | 16 | 2 | 0 | 2 |
| 7A* | 3 | 1.5 | 256 | 20 | 16 | 1 | 1 | 2 |
| 8 | 3 | 1.5 | 256 | 20 | 18 | 2 | 0 | 0 |
| 8A* | 3 | 1.5 | 256 | 20 | 18 | 1 | 1 | 0 |
| 9 | 3 | 1.5 | 256 | 20 | 0 | 2 | 0 | 18 |
| 9A* | 3 | 1.5 | 256 | 20 | 0 | 1 | 1 | 18 |

As shown in Table 3 above, where the $N_{TPC}$ bits are equal to 2, the $N_{UPCI}$ bit is equal to zero. When the $N_{TPC}$ bit is 1, then the $N_{UPCI}$ bit is 1. Accordingly, the WTRU may interpret a slot form such as slot form "0" as both bits being attributable to the TPC while slot form "OA" is interpreted as the second bit being attributable to the UPCI. To allow it to know which slot format is being utilized, the WTRU may be configured by the network, for example via RRC signaling, with the F-DPCH frame format to use. Once configured, the WTRU may then use the same F-DPCH frame format throughout the connection, or until a reconfiguration is received from the network.

In an alternative method of utilizing the F-DPCH slot format $610_i$ of FIG. 6, the "1" bit contained in the UPCI field may indicated the preferred precoding weight while the "1" bit from the TPC field may be utilized for TPC commands. The precoding weight may be indexed by combining the UPCI bit over a fixed number of F-DPCH commands or slots, which may allow for the indexing of more than two precoding weights or weight vectors.

For example, M successive UPCI bits may be combined to index one of 2M pre-defined coding weight vectors. Using an example where M=3, a Node B may signal the index of one of the eight precoding weight vectors by transmitting each bit of the 3 bit index one at a time in the UPCI field over 3 radio slots, which may or may not be consecutive radio slots. The WTRU may then accumulate the 3 UPCI bits and apply the precoding vector at the upcoming UL radio slot edge, or at a predefined future UL radio slot edge. FIG. 7 shows an example F-DPCH frame depicting an example UL feedback bits combining 700. In FIG. 7, the precoding indices are shown as being included in the UFB field of the F-DPCH and designated $a_0a_1a_2$, $b_0b_1b_2$, $c_0c_1c_2$, $d_0d_1d_2$, and $e_0e_1e_2$, for example. The WTRU then decodes and applies the precoding weights on the UL, for example on the DPCCH. In addition, there may be a time delay between receiving the precoding weights and the application of them in the UL.

In another example method for performing closed loop uplink transmit diversity, the 2 bits of the F-DPCH in the TPC field may be alternated over a predetermined cycle to indicate either the TPC command or the precoding weight or weight vector. That is, over a given cycle, the WTRU may interpret the TPC field in some slots as being a TPC command while in others as the UPCI. FIG. 8 shows an example F-DPCH having a UPCI pattern cycle 800. A cycle length, (e.g., $N_{cycle}$ radio slots or a frame), may be configured and an offset, (e.g., $N_{offset}$ in terms of radio slots or subframes), that define a pattern. The pattern then indicates when the TPC command 810 is being transmitted in the slot and when the UPCI 820 is being transmitted. In the example shown in FIG. 8, for instance, $N_{cycle}$ is equal to two radio frames while $N_{offset}$ is equal to 26 radio slots. Alternatively, the cycle length and/or offset may be expressed in units of time, such as milliseconds.

Continuing to refer to FIG. 8, the slot where UPCI bits 820 are transmitted may not carry TPC information. Since the transmitter is not receiving a TPC command at that time, it may maintain the same DPCCH transmission power that was used in the slot immediately preceding the UPCI bits 820 slot, (i.e., the last TPC bits slot 810). After detecting the UPCI bits, the transmitter applies the corresponding precoding weights to uplink transmissions. This application may occur immediately or at a predefined time instant after the transmitter receives the F-DPCH containing the UPCI. In one example, the application may occur at the next slot boundary.

Figure 9:
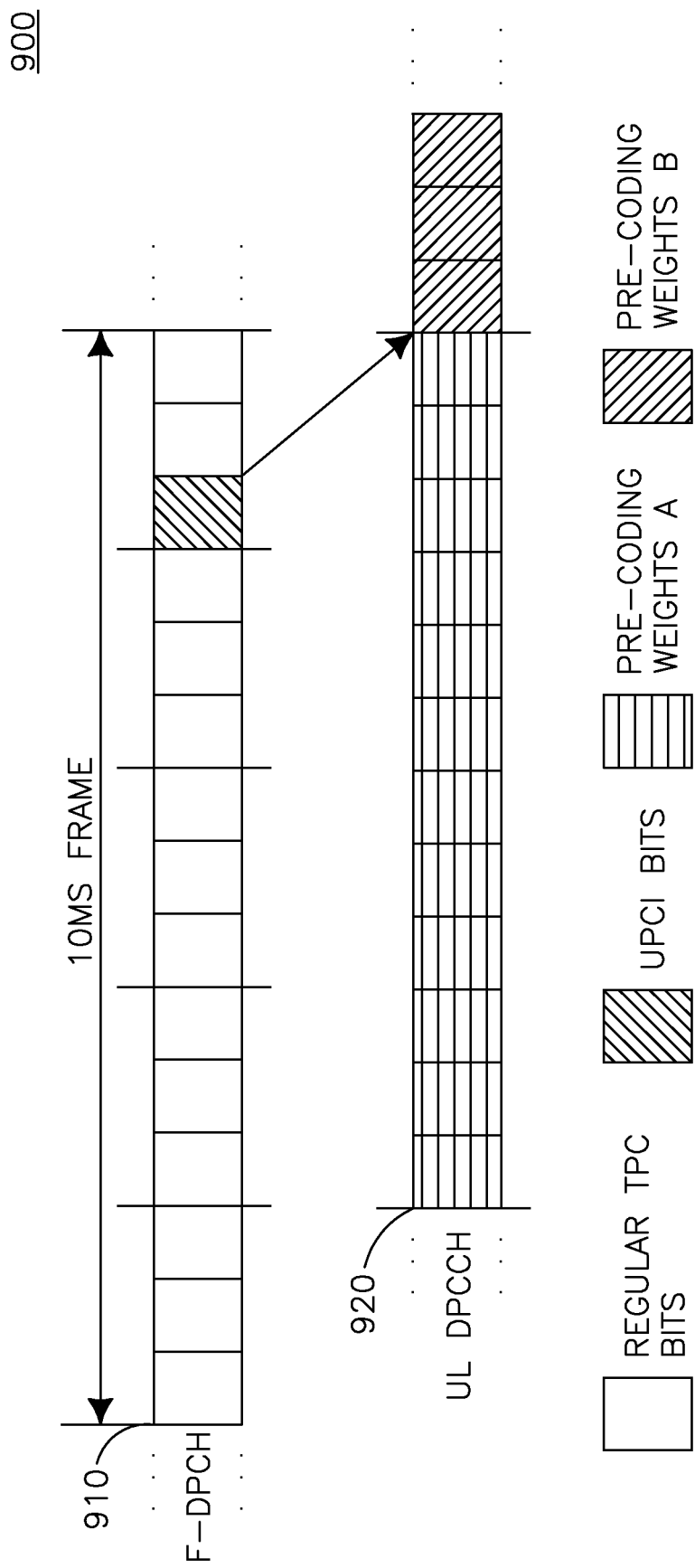
FIG. 9 shows an example F-DPCH having UL feedback transmitted in a single slot.

FIG. 9 shows an example F-DPCH having UL feedback transmitted in a single slot 900. In this example, F-DPCH 910 includes the UPCI bits, which are detected by the transmitter in the downlink. The transmitter then applies the precoding weights in the next frame on the uplink DPCCH 920. For example, as shown in FIG. 9, the transmitter is applying precoding weight vector $w_A$ (A) until receiving the UPCI bits on the F-DPCH 910. At that point, the transmitter detects the UPCI bits and determines that it is to use precoding weight vector $w_B$ (B). Accordingly, at the beginning of the next UL DPCCH frame 920, the transmitter begins applying precoding weight vector $w_B$.

In another method of performing closed loop diversity, feedback may be carried on an additional downlink physical channel. This additional downlink physical channel may take a similar frame and slot format as the existing F-DPCH, for example. In these cases, the WTRU may receive and process up to two F-DPCH like channels simultaneously, where one carries the TPC command and the other one carries precoding information. This method can be used in combination with the other methods for transmitting multiple precoding information bits described herein.

In another example method for performing closed loop transmit diversity, the precoding weights may be transmitted over an enhanced dedicated channel access grant channel (E-AGCH) subframe. The WTRU may utilize the precoding weights transmitted until a new E-AGCH subframe including new precoding weights is received. This signaling may be achieved via a reinterpretation of existing bits in the E-AGCH or by modifying the E-AGCH, (e.g., by adding a UPCI field). A new high speed shared control channel (HS-SCCH) may also be used to indicate the precoding weights, where the WTRU again applies the precoding weights indicated until receiving new precoding weights. In addition, the WTRU may be configured to default to a set of predefined precoding weights after the elapsing of a predetermined period of time after precoding weights are received from a Node-B or the network. For example, once the WTRU receives new precoding weight information, such as carried over the E-AGCH or HS-SCCH, the WTRU may start a timer and apply the new precoding weights. Once the timer expires, the WTRU may revert to applying the predefined default precoding weights. Every time the WTRU receives new precoding weights, the WTRU may reset the timer.

Figure 10:
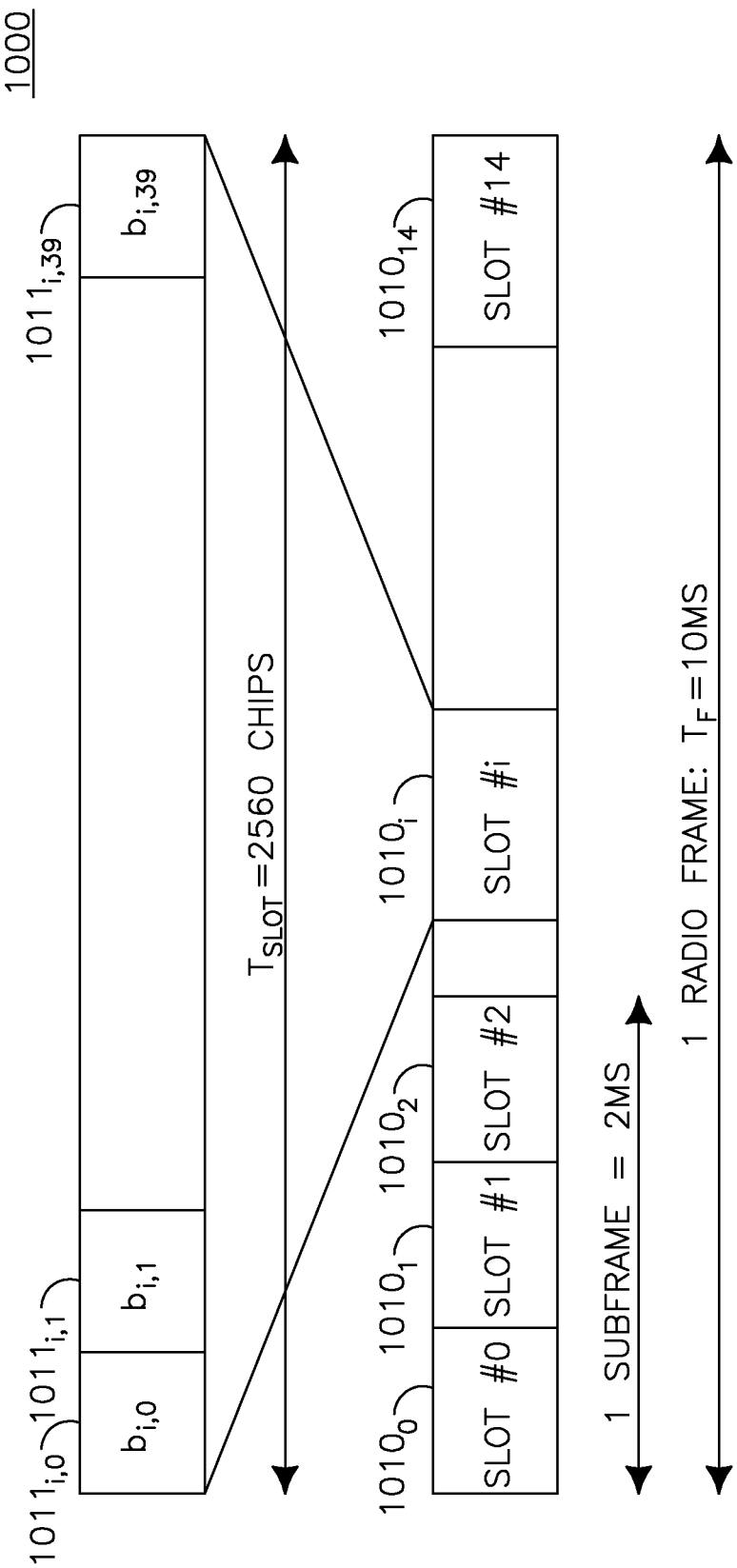
FIG. 10 shows an example frame format for signaling precoding weights in a downlink (DL) channel.

The precoding weights in another example may be transmitted over a downlink control channel such as, or similar to, an E-DCH relative grant channel (E-RGCH) or E-DCH HARQ acknowledgment indicator channel (E-HICH). FIG. 10 shows an example frame format 1000 for signaling precoding weights in a downlink (DL) channel. The frame format 1000 includes a plurality of slots 1010, (designated Slot#0, Slot#1, Slot#2, Slot#i, Slot#14). A bit sequence 1011 is included in each slot 1010. Using Slot#i ($1010_i$) for an example slot, it contains bit sequences $1011_{i,0}$, $1011_{i,1}$, ..., $1011_{i,39}$, containing the bit sequences $b_{i,0}$, $b_{i,1}$, to $b_{i,39}$, respectively, which in turn correspond to one of forty (40) orthogonal sequences.

Each WTRU or a group of WTRUs may be assigned one or multiple orthogonal sequences by the network via RRC signaling which are multiplied or modulated by the signaled precoding weights. These modulated orthogonal sequences may then be repeated over a pre-determined number of slots, (e.g., 3 slots for a 2 ms TTI). Sequence hoping from one TTI to another or from one slot to another within a precoding weight command may also be applied. For example, the sequence hopping used for E-HIGH and E-RGCH, such as in the 3GPP specifications in Release 6, for example, may be used. In this example of sequence hopping, the orthogonal sequence dedicated to a particular WTRU changes every 3 slots in a predefined way.

In the case where multiple Node-Bs 120 or cells are part of the active set of a WTRU, for example where the WTRU is in a soft handover situation, each Node-B 120 or cell of the active set may transfer precoding weight commands to the WTRU using any of the methods described. The WTRU may be configured to combine precoding weight information from all Node-Bs 120 or cells to determine an optimal precoding weight for UL transmission. For example, where precoding weights [w1, w2] may only take on values [1,0] or [0,1], the WTRU may be configured to select the precoding vector for UL transmission as the precoding weight by the majority of Node-Bs 120 or cells in the active set.

Precoding weight commands may alternatively be transmitted by the serving E-DCH Node-B, where other Node-Bs or cells within the active set do not send any precoding weight information. In this case, the WTRU may apply the precoding weight information that was received from the serving E-DCH Node-B.

In order for the Node-B 120 to properly estimate the channels from the two transmit antennas, the WTRU may be configured to transmit pilot bits from each antenna, (i.e., each of antennas 330 or 430), and those pilot bits may be weighted. Furthermore, the Node-B 120 may be configured to differentiate the pilot originating from each antenna. In a system such as a WCDMA FDD system, the pilot bits may be carried over the Dedicated Physical Control Channel (DPCCH).

In one example method, the DPCCH may be transmitted in an alternating manner between each antenna, where the alternating cycle may be predefined or configured by the network. For example, the WTRU may alternate transmission of the DPCCH every slot. In another example, the alternating may be performed every TTI. Alternatively, or additionally, the alternating sequence may depend on the RSN associated to the E-DCH transmission in the same or in a previous TTI.

In another example method, one DPCCH per antenna may be transmitted and the DPCCH for the second antenna may be transmitted using a different scrambling code and/or channelization code. Also, a new slot format of the DPCCH transmitted over the second antenna may be designed such that the new DPCCH only carries pilot bits, (i.e., no TPC command).

In another alternative method, the WTRU may be configured to transmit two orthogonal pilot patterns, or sequences, on two UL transmit antennas. These pilot patterns may be predefined and configured by the higher layers to support MIMO or TX Diversity operations. For backwards capability, the primary antenna may transmit the conventional pilot pattern on the first antenna DPCCH. The secondary antenna may then transmit a different, optionally orthogonal, pilot pattern on DPCCH. The TPC field on the second DPCCH may include additional pilot bits, may carry no information, (i.e., discontinuously transmitted (DTXed)), or may include the same TPC information as the TPC field on the primary DPCCH.

In another alternative method for selecting precoding weights, probing may be employed. In this method, the WTRU may be configured to send a fraction (f1) of its transmissions using a first set of weights, such as w1, where w1 is a vector whose number of elements corresponds to the number of antennas, and a fraction (f2) of its transmissions using a second set of weights w2. In one example, fraction 1 is greater than fraction 2 (f1>f2) and the sum of both fractions is equal to one (f1+f2=1). For instance, the WTRU may transmit using weights w1 for 2 slots out of 3 and weights w2 for the remaining slot. Alternatively, the WTRU may transmit using weights w1 for three sub-frames out of four and weights w2 for one sub-frame out of four. The pattern of weight use may be known by the base station receiver, or Node B 120.

Depending on the fading state of the channel, one of the two sets of weights (w1 or w2) may result in more favorable reception than the other. The base station receiver, or Node B 120, may detect which set of weights is the optimal one based on the knowledge of the pattern and the quality of the reception at a given time instant. Based on this information, the base station, or Node B 120, may send a feedback signal, for example in accordance with one of the feedback methods described above. The feedback signal may be designed in various ways.

For example, the feedback signal may be sent periodically and indicate whether or not the WTRU may interchange the sets of weights w1 and w2, so that the best set of weights may be used during the largest fraction of transmissions, (e.g., f1). In another option, the feedback signal may be sent periodically and indicate which sets of weights may be used during fractions f1 and f2. This may be achieved using a single bit with two sets of pre-defined weights.

In another alternative, the feedback signal may only be sent when the Node B 120 wants to command that the sets of weights be interchanged so that the best set of weights may be used during the largest fraction of transmissions. For instance, there may be a new HS-SCCH order or a special E-AGCH value using a distinct E-DCH Radio Network Temporary Identifier (E-RNTI).

The above fractional weighting options may be extended to the use of more sets of weights than two. In addition, the fractions f1 or f2 may be adjusted by higher layers for optimal performance depending on the coherence time of the channel. It may also be beneficial to have as large a fraction discrepancy (between f1 and f2) as allowed by the speed of channel variations.

It is also an alternative method where the WTRU may indicate to the UTRAN the precoding weights to be applied to the UL transmission. For example, an index to a list of precoding weight vectors that contain individual antenna precoding weights may be signaled as part of the UL transmission. This indication may be in the form of a uplink precoding weight information (UPWI) field.

An UL DPCCH slot format may include the UPWI field or a reinterpretation of some bits in an existing UL DPCCH slot format. Table 4 below shows an example information table of a UL DPCCH slot format, where the last three rows include a UPWI field.

TABLE 4

| Slot Format #i | Channel Bit Rate (kbps) | Channel Symbol Rate (ksps) | SF | Bits/ Frame | Bits/ Slot | $N_{pilot}$ | $N_{TPC}$ | $N_{TFCI}$ | $N_{UPWI}$ | $N_{FBI}$ | Transmitted slots per radio frame |
|---|---|---|---|---|---|---|---|---|---|---|---|
| 0 | 15 | 15 | 256 | 150 | 10 | 6 | 2 | 2 | 0 | 0 | 15 |
| 0A | 15 | 15 | 256 | 150 | 10 | 5 | 2 | 3 | 0 | 0 | 10-14 |
| 0B | 15 | 15 | 256 | 150 | 10 | 4 | 2 | 4 | 0 | 0 | 8-9 |
| 1 | 15 | 15 | 256 | 150 | 10 | 8 | 2 | 0 | 0 | 0 | 8-15 |
| 2 | 15 | 15 | 256 | 150 | 10 | 5 | 2 | 2 | 0 | 1 | 15 |
| 2A | 15 | 15 | 256 | 150 | 10 | 4 | 2 | 3 | 0 | 1 | 10-14 |
| 2B | 15 | 15 | 256 | 150 | 10 | 3 | 2 | 4 | 0 | 1 | 8-9 |
| 3 | 15 | 15 | 256 | 150 | 10 | 7 | 2 | 0 | 0 | 1 | 8-15 |
| 4 | 15 | 15 | 256 | 150 | 10 | 6 | 4 | 0 | 0 | 0 | 8-15 |
| 5 | 15 | 15 | 256 | 150 | 10 | 6 | 2 | 0 | 2 | 0 | 8-15 |
| 6 | 15 | 15 | 256 | 150 | 10 | 4 | 4 | 0 | 2 | 0 | 8-15 |
| 7 | 15 | 15 | 256 | 150 | 10 | 7 | 2 | 0 | 1 | 0 | 8-15 |

In the example where an existing UL DPCCH slot format includes a reinterpretation of bits to determine the precoding weight information, an existing field's contents may be interpreted as the precoding weight information. For example, slot format 5 and slot format 0 are similar to one another. Therefore, the bits in the NTFCI field may be reinterpreted in slot 0 as the precoding weight information.

Additionally, a new E-DPCCH slot format including the uplink precoding weight information field may be utilized. This may be achieved again by adding a UPWI field, for example a 2 bit field, which may increase the code rate of the E-DPCCH. In this example, the total number of bits to code for the E-DPCCH is raised to 12, (i.e., 7 bits for the E-TFCI, 1 happy bit, 2 bits for RSN, and 2 bits for the UPWI). The additional two bits may be coded by adding two new basis in a (32,10) Reed-Muller code resulting in a (32,12) code, for example.

Alternatively, the UPWI bits may be transmitted uncoded in the E-DPCCH or the UPWI bits may be separately coded from the conventional E-DPCCH fields. The conventional fields of the E-DPCCH may coded using the conventional (32,10) Reed-Muller code but only a predefined subset ($N_{E\text{-}DPCCH}$<30) of the resulting coded bits are transmitted. The remaining bits may be used to carry the UPWI. This method allows transmitting the UPWI with different protection than the conventional E-DPCCH fields.

Figure 11:
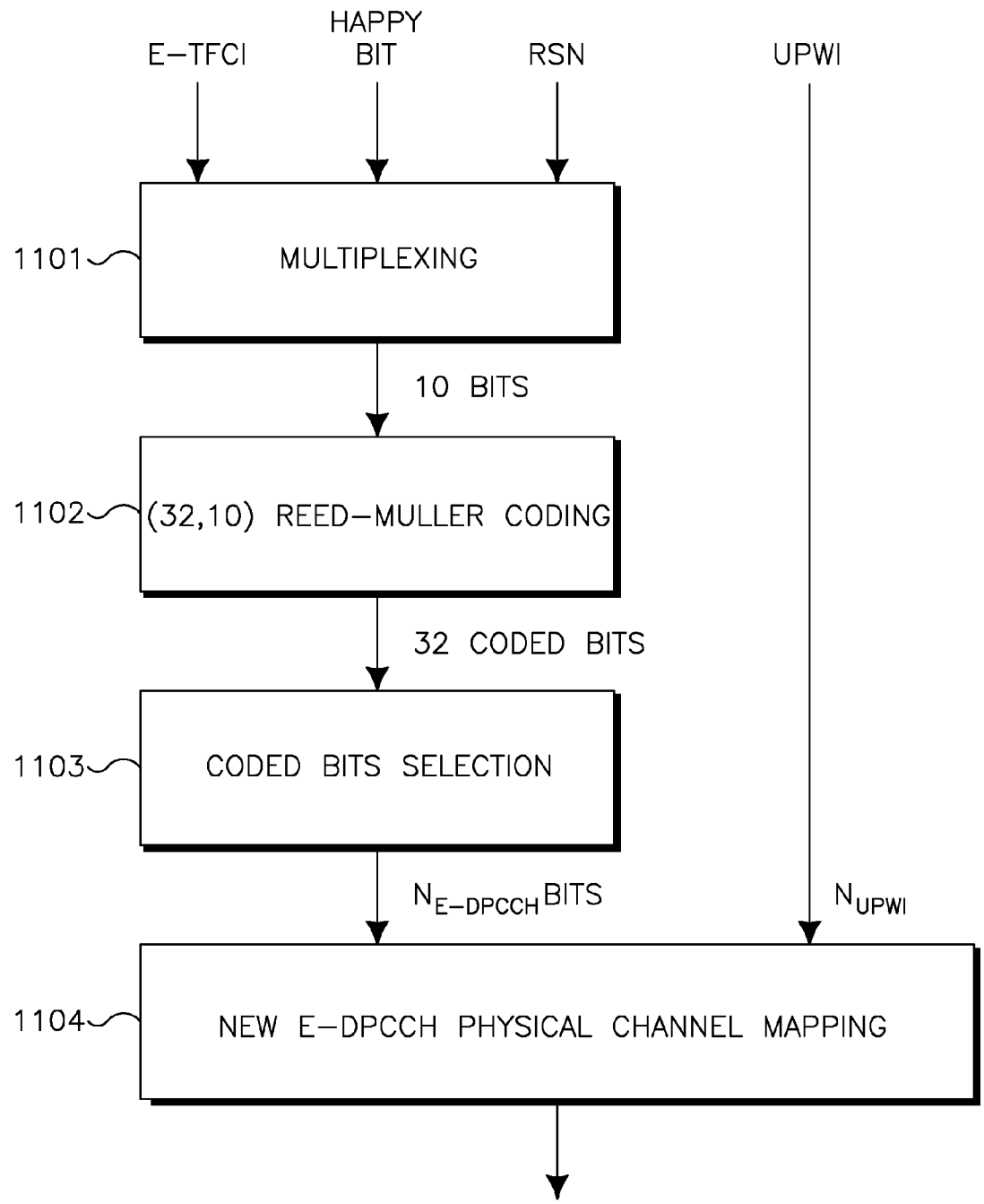
FIG. 11 shows an example coding of an enhanced dedicated physical control channel (E-DPCCH).

FIG. 11 shows an example coding of an E-DPCCH 1100. As shown in FIG. 11, the E-TFCI, Happy Bit, and RSN proceed through a multiplexing function 1101, coding function, (e.g., (32,10) Reed-Muller coding) 1102, and coded bits selection function 1103. The UPWI field is then mapped into the E-DPCCH in the new E-DPCCH physical channel mapping function 1104. For example, the mapping may be carried sequentially, that is all the coded bits from the conventional E-DPCCH fields are transmitted first followed by the bits from the UPWI field. Alternatively, the order of the mapping may be reversed. That is, the bits from the UPWI field are transmitted first, followed by the coded bits from the conventional E-DPCCH fields. In another example, the bits from the UPWI fields may be interleaved with the coded bits from the conventional E-DPCCH fields. One example of interleaving may consist of transmitting one UPWI bit in every slot, for example during the last symbol of the radio slot There are other alternative methods to transmit the uplink precoding weight information from the WTRU. In one example, the uplink precoding weight information may be indicated by the pilot sequence that is transmitted by the WTRU over the UL DPCCH. For example, pilot sequence 1 may be used for precoding weight vector 1 and pilot sequence 2 may be used for precoding weight vector 2. Also, a new Media Access Control (MAC) layer header element or other layer 2 (L2) header information element may be used to transfer the UL precoding information.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for performing uplink (UL) transmit diversity implemented in a wireless transmit/receive unit (WTRU), comprising:
transmitting a pilot bit on a plurality of transmit antennas;
receiving a signal including UL preceding information via a physical channel having slots,
wherein each slot of the physical channel includes a plurality of bits and a subset of the bits is assigned to the WTRU for carrying the UL preceding information for the WTRU wherein the UL preceding information includes UL preceding weights;
applying the UL preceding weights to an UL transmission; and
transmitting the UL transmission;
wherein multiple dedicated physical control channels (DPCCHs) are simultaneously transmitted over a plurality of antennas, wherein the multiple DPCCHs are transmitted using different scrambling codes and/or different channelization codes, or multiple DPCCHs carrying different pilot bit sequences are transmitted.

2. The method of claim 1 wherein the physical channel includes an uplink precoding information field (UPCI) containing the UL preceding information.

3. The method of claim 1 wherein the UL preceding information is included in an enhanced dedicated channel access grant channel (E-AGCH).

4. The method of claim 1, further comprising:
starting a timer after reception of the UL preceding information; and
applying default precoding weights on a condition of expiration of the timer.

5. The method of claim 1 wherein a DPCCH transmitted on a second antenna does not include transmit power control (TPC) information.

6. The method of claim 1 wherein the UL preceding weights are applied to the UL transmission a predetermined time offset after reception of the UL preceding information.

7. The method of claim 1 further comprising combining the bits of the subset of the bits to form an index.

8. The method of claim 7 further comprising determining a UL weight information for the WTRU according to the index.

9. The method of claim 1 including a plurality of WTRUs wherein the precoding information of the WTRUs of the plurality of WTRUs is multiplexed.

10. The method of claim 1 wherein the bits of subsets of the bits of a plurality of different slots are accumulated to provide the UL precoding information.

11. The method of claim 10 wherein the bits of the subsets of the bits of the plurality of different slots are accumulated from consecutive slots.

12. A wireless transmit/receive unit (WTRU), comprising:
a plurality of antennas;
a receiver;
a transmitter; and
a processor in communication with the receiver and the transmitter, the processor configured to transmit a pilot bit on the plurality of antennas, receive a signal including uplink (UL) precoding information via a physical channel having slots,
wherein each slot of the physical channel includes a plurality of bits and a subset of the bits is assigned to the WTRU for carrying the UL precoding information for the WTRU,
wherein the UL precoding information includes UL precoding weights, apply the UL precoding weights to an UL transmission and transmit the UL transmission,
wherein multiple dedicated physical control channels (DPCCHs) are simultaneously transmitted over a plurality of antennas, wherein the multiple DPCCHs are transmitted using different scrambling codes and/or different channelization codes, or multiple DPCCHs carrying different pilot bit sequences are transmitted.

13. The WTRU of claim 12 wherein the physical channel includes an uplink precoding information (UPCI) field containing the UL precoding information.

14. The WTRU of claim 12 wherein the processor is configured to receive the UL precoding information via an enhanced dedicated channel access grant channel (E-AGCH).

15. The WTRU of claim 12 wherein the processor is configured to start a timer after reception of the UL precoding information and apply default precoding weights on a condition of expiration of the timer.

16. The WTRU of claim 12 wherein the processor is configured to transmit multiple dedicated physical control channels (DPCCHs) simultaneously over a plurality of antennas, wherein the multiple DPDDHs are transmitted using different scrambling codes and/or channelization codes, in time alternation, or multiple DPCCHs carrying different pilot bit sequences are transmitted.

17. The WTRU of claim 16 wherein the processor is configured to not include transmit power control (TPC) information in a DPCCH transmitted on a second antenna.

18. The WTRU of claim 12 wherein the processor is configured to apply the UL precoding weights to the UL transmission a predetermined time offset after reception of the UL precoding information.

19. The method of claim 12 wherein the processor is configured to accumulate the bits of the subset of the bits to form an index.

20. The method of claim 19 further comprising determining the UL weight information for the WTRU according to the index.

21. The method of claim 12 including a plurality of WTRUs wherein the precoding information of the WTRUs of the plurality of WTRUs is multiplexed.

22. The method of claim 12 wherein the bits of subsets of the bits of a plurality of different slots are accumulated to provide the UL precoding information.

23. The method of claim 22 wherein the bits of the subsets of the bits are accumulated from consecutive slots.

* * * * *

UNITED STATES PATENT AND TRADEMARK OFFICE
CERTIFICATE OF CORRECTION

PATENT NO. : 8,830,918 B2  
APPLICATION NO. : 12/723131  
DATED : September 9, 2014  
INVENTOR(S) : Benoit Pelletier et al.

Page 1 of 1

It is certified that error appears in the above-identified patent and that said Letters Patent is hereby corrected as shown below:

On the Title Page

Item (56), page 3 - ""International Search Report and Written Opinion," International Application No. PCT/US2010/024632, May 25, 2012, 14 pages." should be replaced with --International Search Report and Written Opinion," International Application No. PCT/US2012/024632, May 25, 2012, 14 pages.--;

In the Claims in Claim 1, at column 12, line 31, "preceding" should be replaced with --precoding--;
in Claim 1, at column 12, line 35, "preceding" should be replaced with --precoding--;
in Claim 1, at column 12, line 36, "preceding" should be replaced with --precoding--;
in Claim 1, at column 12, line 37, "preceding" should be replaced with --precoding--;
in Claim 1, at column 12, line 38, "preceding" should be replaced with --precoding--.

Signed and Sealed this
Thirtieth Day of December, 2014

Michelle K. Lee
*Deputy Director of the United States Patent and Trademark Office*